United States Patent
Arguelles (10) Patent No.: US 10,332,027 B2
(45) Date of Patent: Jun. 25, 2019

(54) AUTOMATED TUNING OF A SERVICE CONFIGURATION

(71) Applicant: Amazon Technologies, Inc., Seattle, WA (US)

(72) Inventor: Carlos Alejandro Arguelles, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1019 days.

(21) Appl. No.: 14/733,905

(22) Filed: Jun. 8, 2015

(65) Prior Publication Data

US 2015/0269496 A1 Sep. 24, 2015

Related U.S. Application Data

(62) Division of application No. 13/710,013, filed on Dec. 10, 2012, now Pat. No. 9,053,070.

(51) Int. Cl.
| | |
|---|---|
| *G06F 15/18* | (2006.01) |
| *G06N 20/00* | (2019.01) |
| *G06F 15/177* | (2006.01) |
| *H04L 12/24* | (2006.01) |
| *G06F 11/36* | (2006.01) |
| *G06F 11/34* | (2006.01) |

(52) U.S. Cl.
CPC ............ *G06N 20/00* (2019.01); *G06F 11/34* (2013.01); *G06F 11/3672* (2013.01); *G06F 15/177* (2013.01); *H04L 41/0823* (2013.01); *H04L 41/0886* (2013.01)

(58) Field of Classification Search
CPC .................................................. H04L 67/1008
USPC .............................................. 706/12, 15, 45
See application file for complete search history.

(56) References Cited

U.S. PATENT DOCUMENTS

| | | | |
|---|---|---|---|
| 6,110,214 A | 8/2000 | Klimasauskas | |
| 6,934,934 B1 | 8/2005 | Osborne, II et al. | |
| 7,640,236 B1 | 12/2009 | Pogue | |
| 7,756,989 B2 | 7/2010 | Goldszmidt et al. | |
| 8,095,486 B2 | 1/2012 | Chen et al. | |
| 8,676,530 B2 | 3/2014 | Roth et al. | |
| 2005/0114397 A1 | 5/2005 | Doshi et al. | |
| 2005/0262230 A1 | 11/2005 | Liu et al. | |
| 2008/0155074 A1* | 6/2008 | Bacinschi | G06F 9/44505 709/222 |

(Continued)

OTHER PUBLICATIONS

U.S. Appl. No. 13/710,013, filed Dec. 10, 2012, Carlos Alejandro Arguelles.

*Primary Examiner* — David R Vincent
(74) *Attorney, Agent, or Firm* — Robert C. Kowert; Meyertons, Hood, Kivlin, Kowert & Goetzel, P.C.

(57) ABSTRACT

Methods and systems for automated tuning of a service configuration are disclosed. An optimal configuration for a test computer is selected by performing one or more load tests using the test computer for each of a plurality of test configurations. The performance of a plurality of additional test computers configured with the optimal configuration is automatically determined by performing additional load tests using the additional test computers. A plurality of production computers are automatically configured with the optimal configuration if the performance of the additional test computers is improved with the optimal configuration.

20 Claims, 7 Drawing Sheets

(56) References Cited

U.S. PATENT DOCUMENTS

2011/0288791 A1* 11/2011 Jeppesen ................ G01N 3/38
 702/42
2012/0047250 A1 2/2012 Lai et al.

* cited by examiner

AUTOMATED TUNING OF A SERVICE CONFIGURATION

This application is a divisional of U.S. patent application Ser. No. 13/710,013, filed Dec. 10, 2012, now U.S. Pat. No. 9,053,070, which is hereby incorporated by reference in its entirety.

BACKGROUND

Tuning the configuration of a service on a computer system to handle a desired load is typically a manual process. In other words, a tuning process typically involves a user manually tweaking different attributes of the service or the underlying system in the hopes of improving the performance of the system running the service. The attributes to be tweaked may be as specific as the numbers of threads in different thread pools but may include any aspect of the service that might affect performance or throughput. Multiple attributes may need to be manually modified many times in an effort to improve the performance significantly, especially if performance is dependent on multiple interrelated attributes. For heterogeneous multi-host web services that have specific targets in terms of throughput, latency, or stability, the tuning process may be especially complex and time-consuming.

A typical approach to this manual tuning process involves trial and error. A user may making some initial guesses on optimal values, put the service into production based on the guesses, and manually analyze the load it can handle. The user may then tweak the values even further, again based on guesswork. In some circumstances, parts of the system will change dramatically over time, thus making the original estimates outdated. However, because this approach to tuning is manual and time-consuming, the tuning may not be performed on a regular basis. As a result, outdated and inefficient settings may remain in place until they have significantly adverse effects on performance. When performance estimates are outdated or entirely absent, hardware resources may be wasted on systems that are not operating optimally. For example, in a fleet of 10,000 hosts, a 10% improvement in throughput can mean a savings of 1000 hosts as well as savings in resources such as network bandwidth and power consumption.

Accordingly, it is desirable to have efficient techniques for tuning services.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for automated tuning of a service configuration are described. Using the systems and methods described herein, intelligent and automated tuning of a service may be performed to determine an optimal configuration on test computers before the optimal configuration is put into production. The optimal configuration may be rolled back if it adversely affects the performance of production computers. In one embodiment, the automated tuning may be applied to any numerically configurable parameter that may affect performance, throughput, or stability. The optimal configuration may be determined such that a user-specified performance goal is met, and the user need not be aware of the specific configurable parameters that are tuned.

Figure 1:
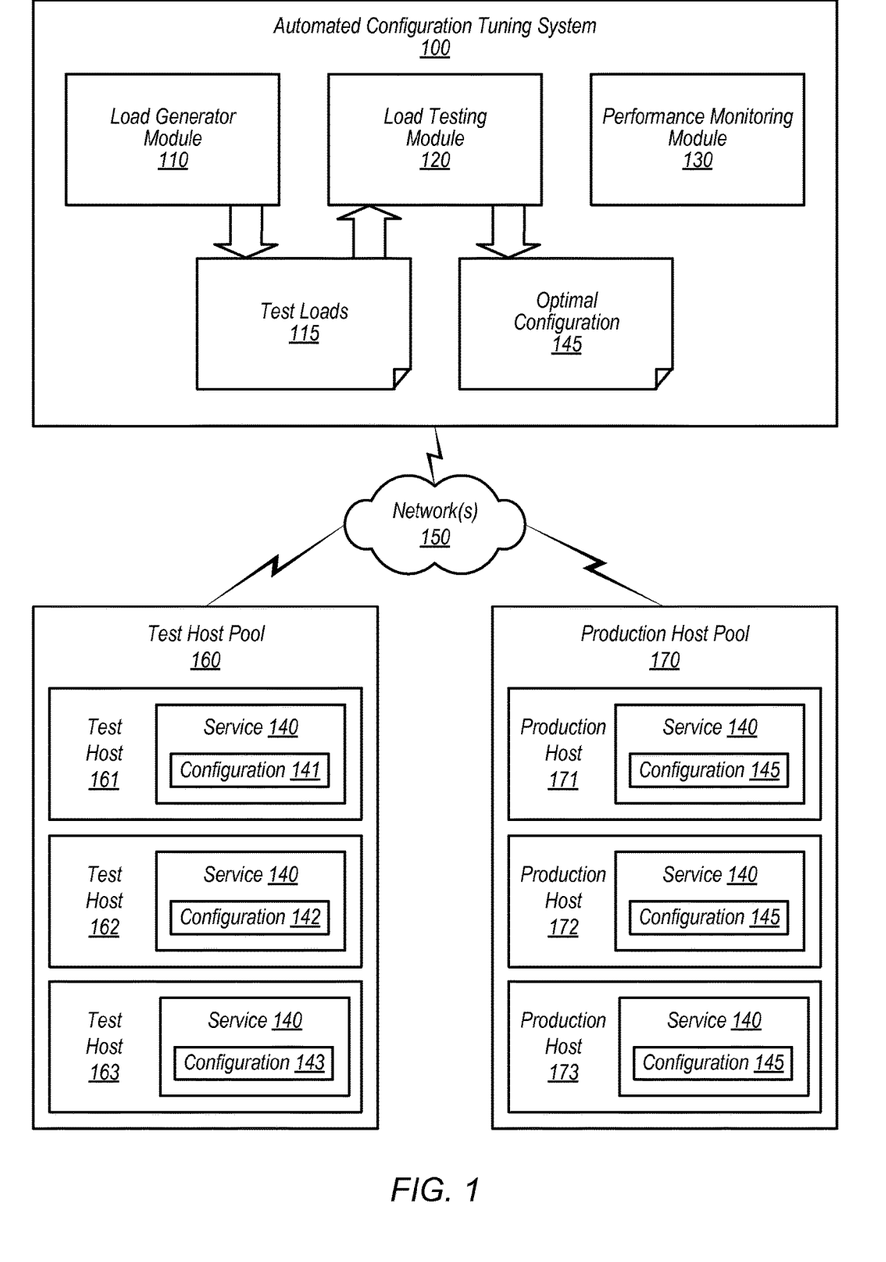
FIG. 1 illustrates an example system environment for automated tuning of a service configuration, according to one embodiment.

FIG. 1 illustrates an example system environment for automated tuning of a service configuration, according to one embodiment. The example system environment may comprise an automated configuration tuning system 100. The automated configuration tuning system 100 may include various modules such as a load generator module 110, a load testing module 120, and a performance monitoring module 130. The automated configuration tuning system 100 may comprise one or more computing devices, any of which may be implemented by the example computing device 3000 illustrated in FIG. 7. In various embodiments, the functionality of the different modules (e.g., load generator module 110, load testing module 120, and performance monitoring module 130) may be provided by the same computing device or by different computing devices. If any of the load generator module 110, load testing module 120, and performance monitoring module 130 are implemented using different computing devices, then the modules and their respective computing devices may be communicatively coupled, e.g., via a network. Each of the load generator module 110, load testing module 120, and performance monitoring module 130 may represent any combination of software and hardware usable to perform their respective functions, as discussed as follows.

The load generator module 110 may generate a plurality of test loads 115 for use in the load testing of a service 140. For example, if the service 140 is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc. Each test load may comprise data associated with a plurality of transactions or other operations that are processed by the service 140. The test loads may vary in transaction frequency (e.g., transactions per second). The test loads may be generated by sampling actual production transactions or by generating synthetic transactions. The functionality of the load generator module 110 is discussed in greater detail below with respect to FIG. 4.

Figure 7:
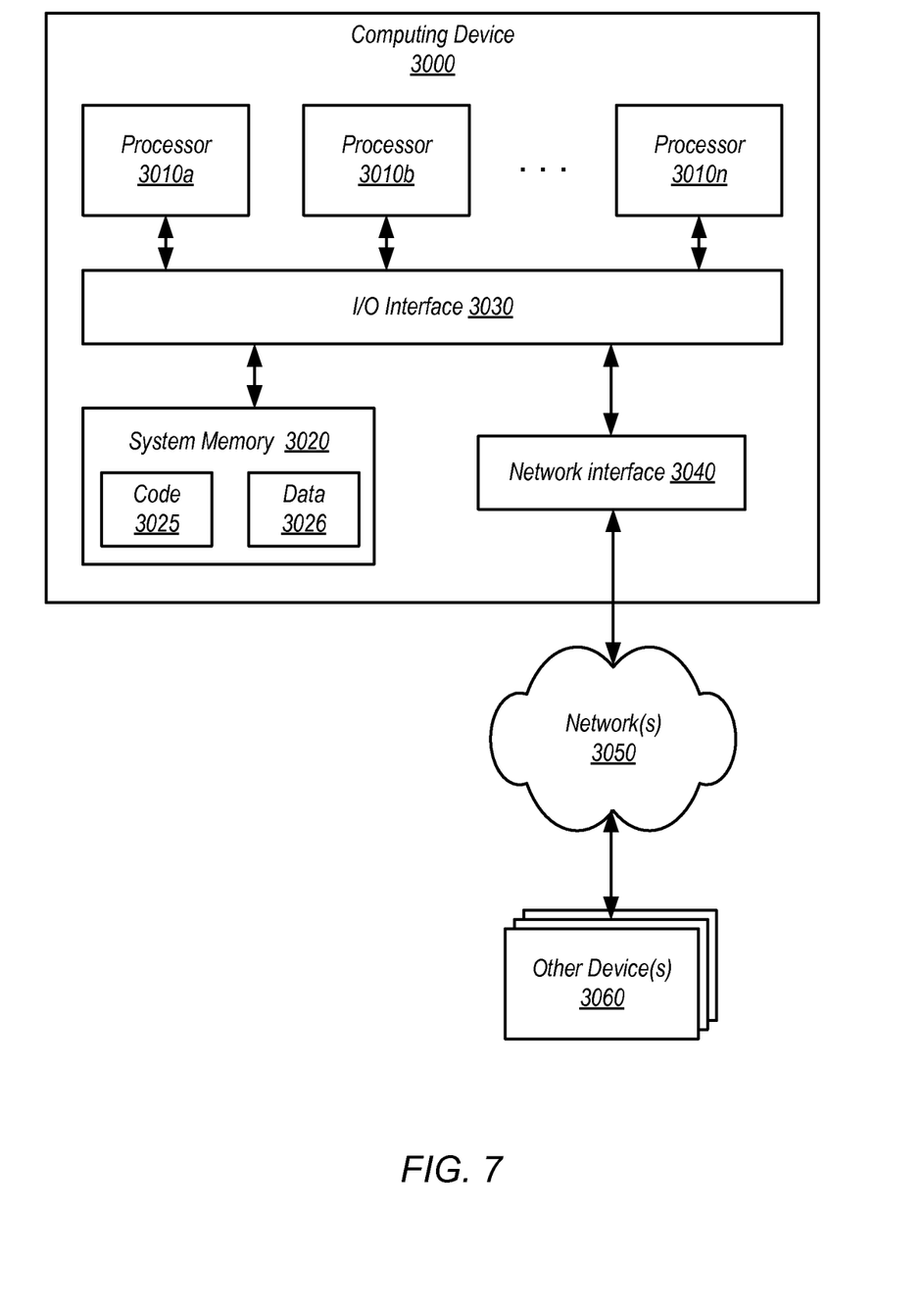
FIG. 7 illustrates an example computing device that may be used in some embodiments.

Turning back to FIG. 1, the automated configuration tuning system 100 may be communicatively coupled to a plurality of other computer systems, any of which may be implemented by the example computing device 3000 illustrated in FIG. 7, over one or more network(s) 150. The automated configuration tuning system 100 may be communicatively coupled to a test host pool 160 comprising a plurality of test computer systems. For purposes of illustration, the test host pool 160 is depicted in FIG. 1 as including three test hosts 161, 162, and 163. However, it is contemplated that any suitable number of test hosts may be used. Software implementing the service 140 may be installed on, and executed by, each of the test hosts 161, 162, and 163.

The test host pool 160 may be used to determine an optimal configuration 145 for the service 140. The load testing module 120 may use the test loads 115 to perform load tests using one or more of the computer systems in the test host pool 160. In one embodiment, a first set of load tests may be performed using a single one of the test hosts, e.g., test host 161. Each of many test configurations of the service 140, such as configurations 141, 142, and 143, may be subjected to load tests using the test loads 115. In one embodiment, a plurality of the test hosts 161, 162, and/or 163 may each be used for simultaneous and independent load testing of different test configurations. Each configuration of the service 140 may comprise a different set of values for one or more configurable parameters of the service. An example of configurable parameters is discussed below with respect to FIG. 3. Turning back to FIG. 1, in one embodiment, each test configuration may be subjected to test loads 115 of increasingly greater transactions per second. Based on the results of the load testing of the different test configurations, the load testing module 120 may select an optimal configuration 145 from among the test configurations. The optimal configuration 145 may comprise optimal values for the one or more configurable parameters of the service 140.

In one embodiment, the load testing module 120 may further validate the optimal configuration 145 by performing additional load tests on a plurality of test hosts 161, 162, and/or 163 using the optimal configuration. The additional load tests may determine whether the optimal configuration 145 is scalable from one host to many hosts. If the optimal configuration 145 adversely affects the performance of the test host pool 160, then the individual hosts in the test host pool 160 may be reverted to an earlier configuration of the service 140. The functionality of the load testing module 120 is discussed in greater detail below, e.g., with respect to FIG. 5.

Turning back to FIG. 1, the automated configuration tuning system 100 may also be communicatively coupled to a production host pool 170 comprising a plurality of production computer systems. For purposes of illustration, the production host pool 170 is depicted in FIG. 1 as including three production hosts 171, 172, and 173. However, it is contemplated that any suitable number of production hosts may be used. Software implementing the service 140 may be installed on, and executed by, each of the production hosts 171, 172, and 173. The production hosts 171, 172, and 173 may comprise computer systems used in conducting the primary or real-world operations of an entity. For example, if the entity is an e-commerce merchant, then the production hosts 171, 172, and 173 may be used to process real-world transactions with customers.

Once the optimal configuration 145 has been selected and validated by the load testing module 120, the optimal configuration may be deployed to the production hosts 171, 172, and 173. In deploying the optimal configuration, the configurable parameters of the service 140 may be set to the optimal values in each host in the production host pool 170. The performance monitoring module 130 may then monitor the performance of the service 140 with the optimal configuration 145 in the production host pool 170. In one embodiment, the performance monitoring module 130 may receive performance data from a performance monitoring agent running on each production host and then analyze the performance data. If the performance monitoring module 130 determines that the optimal configuration is adversely affecting the performance of the production host pool 170, then the individual hosts in the production host pool 170 may be reverted to an earlier configuration of the service 140.

Figure 2:
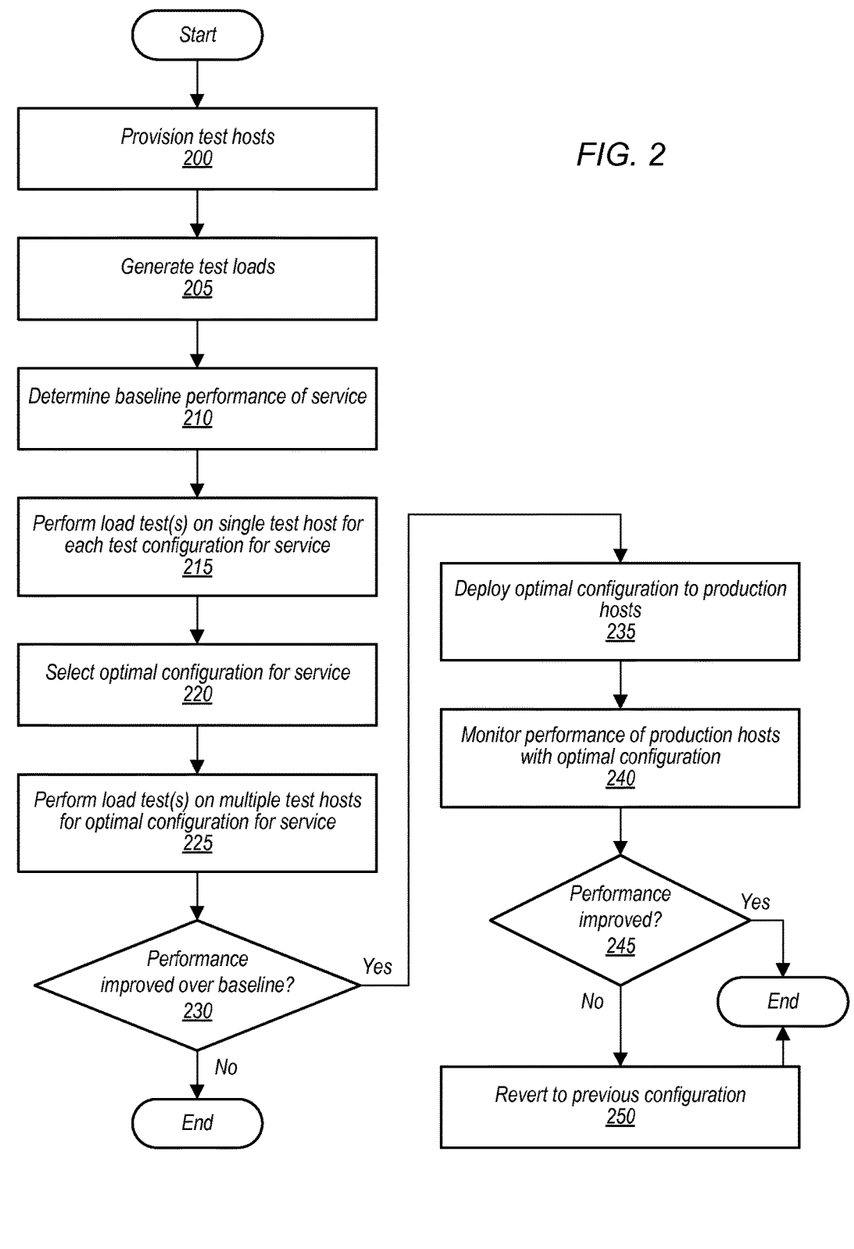
FIG. 2 is a flowchart illustrating a method for automated tuning of a service configuration, according to one embodiment.

FIG. 2 is a flowchart illustrating a method for automated tuning of a service configuration, according to one embodiment. As shown in 200, a plurality of test hosts may be provisioned. Provisioning the test hosts may comprise configuring the test hosts to match the specifications and/or configuration of one or more production hosts, e.g., production hosts whose performance is sought to be tuned. In one embodiment, provisioning the test hosts may comprise installing and/or configuring the service 140 along with other associated software. In one embodiment, the test hosts may be provisioned by borrowing hosts from the production host pool 170 on a temporary basis. However, safeguards may be established (e.g., to delay the automated tuning) if the borrowing of the production hosts would adversely affect the production environment. In one embodiment, the test hosts may be provisioned by selecting them from a pool of available test hosts based on the similarity of their hardware configuration to the production hosts running the service 140 to be tuned. In one embodiment, the number of test hosts may be configured by a user. In one embodiment, the user may specify a percentage of production hosts to be temporarily provisioned as test hosts.

As shown in 205, a plurality of test loads may be generated. The test loads may be associated with data processed by the service 140 whose performance is sought to be tuned. The generation of the test loads is discussed in greater detail below with respect to FIG. 4.

Turning back to FIG. 2, as shown in 210, a baseline performance of the service may be determined. In one embodiment, the baseline performance may be determined by running baseline load tests of the service 140 on one or more of the provisioned test hosts using an existing configuration of the service. The baseline performance may be determined for a single test host and also for a plurality of test hosts. The baseline load tests may use the test loads generated in 205. In another embodiment, the baseline performance may be determined by monitoring the real-world performance of production hosts processing production transactions. The baseline performance may measure any suitable performance attribute(s), such as memory usage, processor usage, network throughput, network latency, response time, etc. In one embodiment, the performance attribute(s) measured for the baseline performance may be relevant to a performance goal specified by a user.

As shown in 215, one or more load tests may be performed on a single test host for each test configuration. The load tests may use the test loads generated in 205. Each test load may comprise data associated with a plurality of transactions or other operations that are processed by the service 140. For each test configuration, the test loads may increase in transaction frequency (e.g., transactions per second) for each successive load test. In one embodiment, the duration of each test may be user-configured. The load testing is discussed in greater detail below with respect to FIG. 5.

Turning back to FIG. 2, as shown in 220, the optimal configuration may be selected from among the configurations tested in 215. In one embodiment, the optimal configuration may be determined such that a user-specified performance goal is met, and the user need not be aware of the specific configurable parameters that are tuned. The optimal configuration 145 may comprise optimal values for the one or more configurable parameters of the service 140.

The optimal configuration may then be deployed to the entire set of provisioned test hosts. In deploying the optimal configuration, the configurable parameters of the service 140 may be set to the optimal values in the other test hosts. As shown in 225, one or more additional load tests may be performed on a plurality of the provisioned test hosts with the optimal configuration. The additional load tests may also use the test loads generated in 205. In performing the additional load tests, a pre-production performance of the test hosts may be determined. The pre-production performance may measure any suitable performance attribute(s), such as memory usage, processor usage, network throughput, network latency, response time, etc., that are relevant to the user-specified performance goal.

As shown in 230, the pre-production performance of the test hosts with the optimal configuration may be compared to the baseline performance. The comparison may involve the numerical values measured for one or more specified performance goals. If the pre-production performance is not better than the baseline performance, then the tuning method may end, and the optimal configuration determined in 220 may be discarded.

If, however, the pre-production performance is better than the baseline performance, then, as shown in 235, the optimal configuration may be deployed to the production hosts. In deploying the optimal configuration, the configurable parameters of the service 140 may be set to the optimal values in the production hosts. Using the production hosts, the service may then operate with the optimal configuration to process production traffic.

As shown in 240, the performance of the production hosts may be monitored after the optimal configuration has been deployed. As shown in 245, the performance of the production hosts with the optimal configuration may be compared to a previous performance of the production hosts with a previous configuration. The comparison may involve the numerical values measured for one or more specified performance goals. If the current performance is not better than the earlier performance, then, as shown in 250, the production hosts may be reverted to the previous configuration. On the other hand, if the performance of the production hosts is improved by the optimal configuration, then the production hosts may be left to operate with the optimal configuration, pending another tuning operation at a later time.

In one embodiment, the method shown in FIG. 2 may be performed automatically and according to a schedule or on a periodic basis. In one embodiment, a cron-like daemon or other suitable scheduling component may be used to invoke the automated service configuration tuning process at appropriate times. The schedule or periodic basis may be established by a user. A performance goal for the tuning operation may also be established by a user. In one embodiment, any of the operations shown in FIG. 2 may be performed automatically (e.g., without manual instruction from a user or otherwise independent of direct user control) and/or programmatically (e.g., by execution of suitable program instructions).

Figure 3:
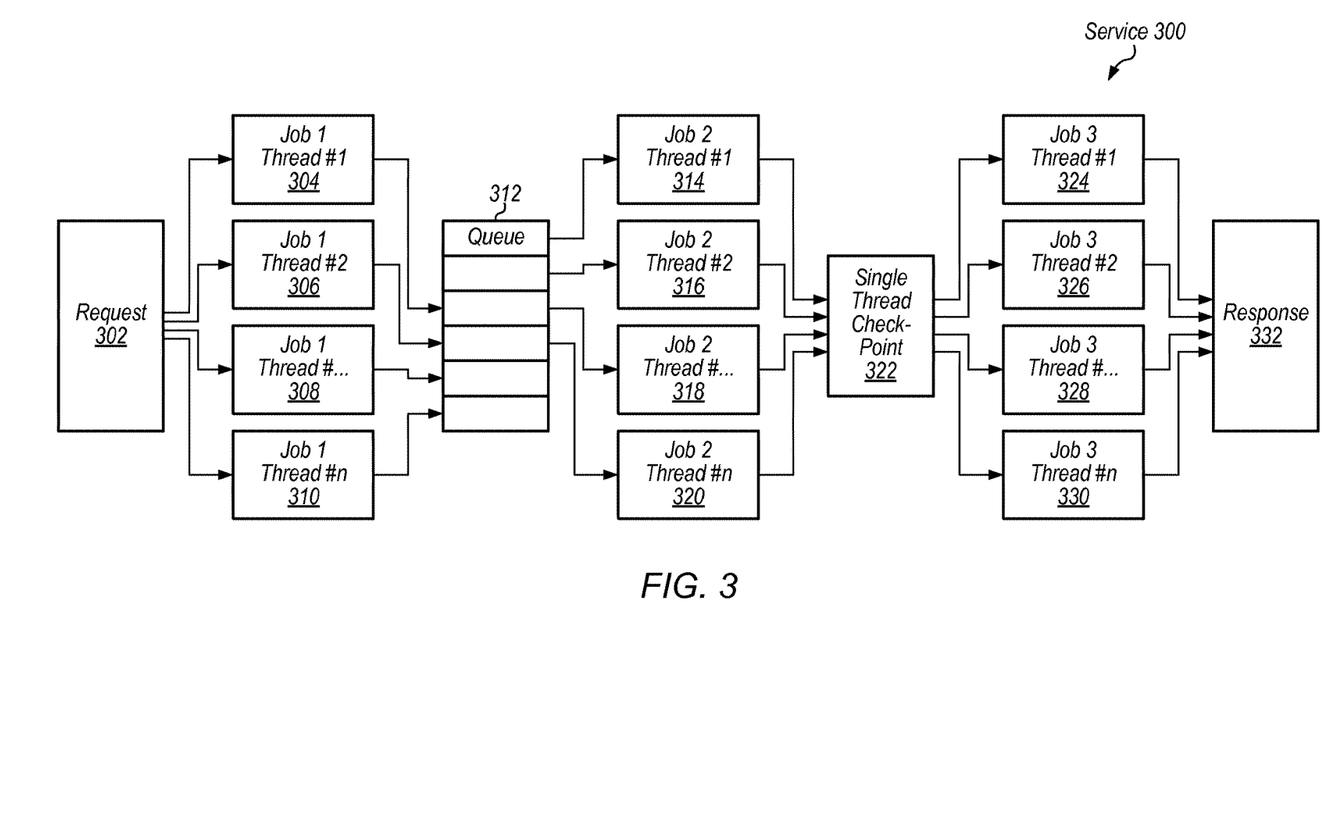
FIG. 3 illustrates an example of a service configuration that may be automatically tuned, according to one embodiment.

FIG. 3 illustrates an example of a service configuration that may be automatically tuned, according to one embodiment. In processing requests to generate responses, such as request 302 and response 332, a service 300 may use multiple thread pools. In this example, a first thread pool may include a first number of threads, including threads 304, 306, 308, and 310; a second thread pool may include a second number of threads, including threads 314, 316, 318, and 320; and a third thread pool may include a third number of threads, including threads 324, 326, 328, and 330. In one part of the workflow, a queue 312 may connect the first thread pool and the second thread pool. In another part of the workflow, a single-threaded checkpoint 322 may connect the second thread pool and the third thread pool. Using the systems and method described herein for automated service configuration tuning, the numbers of threads in each of the three thread pools may be optimized. In one embodiment, the thread pools may be optimized based on a user-specified performance goal that does not specify the numbers of threads in each thread pool. For example, the user-specified performance goal may specify a higher-level result such as a particular transactions per second (TPS) and payload within a particular latency or cost. In this manner, a layer of abstraction may be placed between the user of the automated tuning system and aspects of the specific hardware and/or software configuration of the hosts being tuned.

Figure 4:
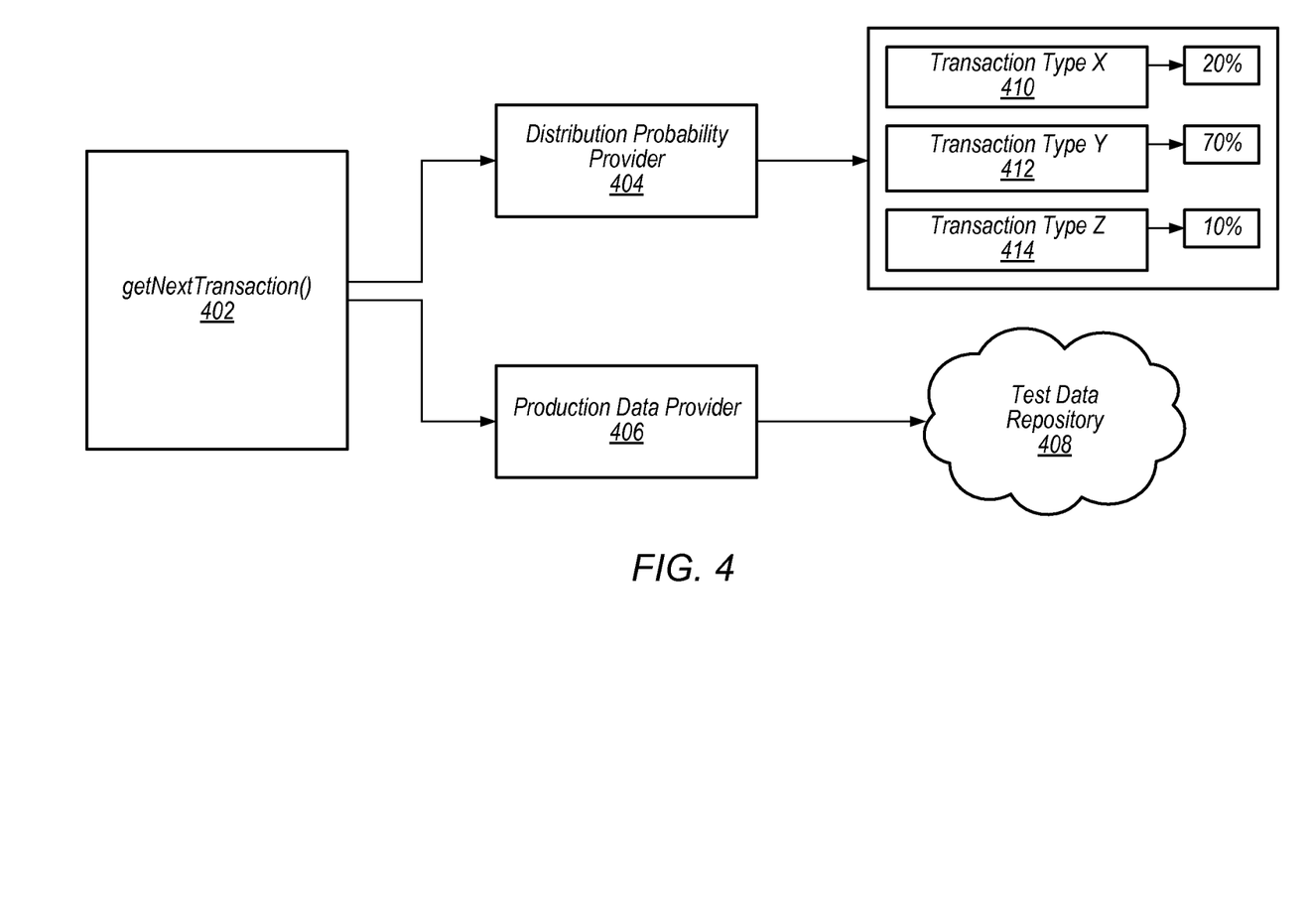
FIG. 4 illustrates aspects of a load generator module, according to one embodiment.

FIG. 4 illustrates further aspects of a load generator module, according to one embodiment. The load generator module 110 may be implemented using a suitable software component, such as a getNextTransaction( )method 402. The getNextTransaction( )method 402 may be a generic load generator function that may be configured by a user, e.g., to generate different types of test loads 115. In one embodiment, the getNextTransaction( )method 402 may be configured to use either a Production Data Provider component 406 or a Distribution Probability Provider component 404. In one embodiment, the generic getNextTransaction( )method 402 may control overall transactions per seconds and concurrent connections. In one embodiment, the generic getNextTransaction( )method 402 may record latency measures for each transaction and compute percentile metrics (such as P90 latency for a specific TPS).

The Production Data Provider 406 may sample real-world production data (e.g., data associated with production transactions). The sampled production data may be saved to a Test Data Repository (TDR) 408 by a batch process. When test loads are generated, the Production Data Provider may fetch the next transaction out of the TDR 408. Accordingly, the Production Data Provider 406 may be used in conjunction with the getNextTransaction( )method 402 when real-world transaction patterns are desired for use with the automated tuning.

The Distribution Probability Provider 404 may generate synthetic test loads and may thus be used for modeling transaction patterns that are not easily found in current production data. In configuring the Distribution Probability Provider 404, the user may define different operation types and the desired percentage distribution of the operations. In the example shown in FIG. 4, the Distribution Probability Provider 404 is configured such that transaction type X 410 is called 20% of the time, transaction type Y 412 is called 70% of the time, and transaction type Z 414 is called 10% of the time. The load generator module 110 may distribute the calls accordingly, and the user may supply any suitable plug-ins or other service-specific program code to perform the calls. For example, if the system is a RESTful web service that is currently getting 10% POST requests and 90% GET requests, but it is expected that it will later receive 30% POST requests and 70% GET requests, then the Distribution Probability Provider 404 may more closely model the future pattern than the Production Data Provider 406.

In one embodiment, the automated configuration tuning system 100 may automatically detect the configurable parameters of a service along with the current parameter values and the range of potential parameter values (i.e., the maximum and minimum values). The values of the parameters in the test configurations may then be assigned within the appropriate range. To implement this auto-discovery functionality, the automated configuration tuning system 100 may include an administrative application programming interface (API) to modify the configurable parameters. In one embodiment, each service being tuned may expose a debug hook that includes the following calls: getAllVariables( ) and setVariable(variable,value). The getAllVariables( ) call may return a set of one or more variables (e.g., parameters) that can be tuned, and the setVariable(variable, value) call may set the indicated variable to the supplied value.

Each variable returned by getAllVariables( ) may include the following data: a unique ID, a data type, a minimum and maximum value to try, and a priority value. The unique ID describes the particular variable, e.g., "ThreadPool-DoingWorkX" or "ThreadPool-DoingWorkY." The data type indicates a suitable data type of the parameter value, such as an integer or a double-precision floating point value. The priority value may allow parameters to be separated into tiers such as priority 1 and priority 2, where the automated tuning system may favor priority 1 variables to be optimized over priority 2 variables, all other things being equal. The variables returned by getAllVariables( ) and set by setVariable(variable,value) may include any configurable parameter, such as, for example, a number of threads in a thread pool, a number of elements to process before stopping, a percentage of records to sample, a buffer size, a number of database connections, or any other parameter with a range that could potentially affect performance.

Figure 5:
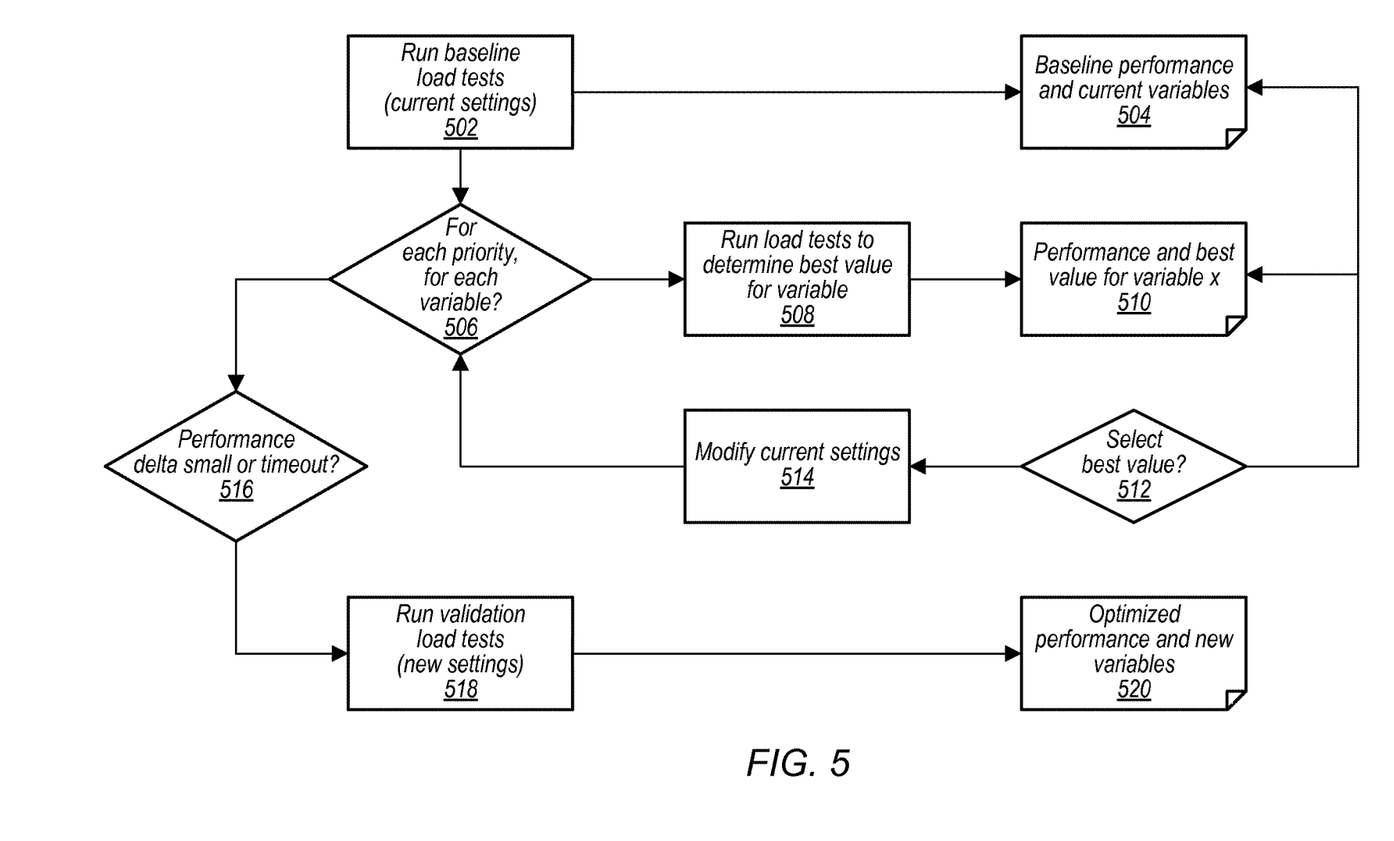
FIG. 5 illustrates aspects of a load testing process for determining an optimal configuration, according to one embodiment.

FIG. 5 illustrates further aspects of a load testing process for determining an optimal configuration, according to one embodiment. The load testing process performed by the load testing module 120 may loop several times for all variables. In one embodiment, the load testing module 120 may perform iterations of a hill-climbing loop, in which the transactions per second on a service are increased with each iteration to determine the maximum throughput that a host can handle within a desired latency and stability.

As shown in 502, baseline load tests may be run based on current settings. As shown in 504, the baseline performance and current variables may be stored. As shown in 506, load tests may be performed for each priority and for each configurable variable. As shown in 508, load tests may be run to determine the best value for the variable. The load testing process may start at a desired low transactions per second (TPS), run at that TPS for a specified amount of time (measuring the latency of each individual call), and gradually increase the TPS. The load testing process may compute percentile metrics and give the user the ability to specify complex requirements. For example, the user may specify a requirement such as "run until it is no longer the case that the P50 latency is <300 ms and the P90 latency is <2500 ms," in which case the maximum TPS is calculated based on latency requirements. As another example, the user may specify a requirement such as "optimize for throughput," in which case latency may be sacrificed if it produces an overall larger throughput. As yet another example, the user may specify a requirement such as "run until the failure rate is >0.1%."

As shown in 510, the performance and best value for each variable may be stored. As shown in 512, the best value may be selected. As shown in 514, the current settings may be modified based on the selection of the best value for a particular variable. As shown in 516, the load testing process may stay in the loop indicated in 506 until the difference in performance is sufficiently small or until a timeout condition is reached. As shown in 518, validation load tests may then be run based on the new settings. As shown in 510, the optimized performance and new variables may be stored.

Some configurable parameters may be completely independent, but others may affect one another. For example, let the configurable parameters be x and y, where originally x=10 and y=7. On the first pass, the load testing process may determine that for y=7, the best value for x is 13. However, the load testing process may then decide that for x=13, the best value for y is 9. The load testing process may then iterate through all the variables a second time and determine that for y=9, the best value for x is 21. If the solution never converges, the load testing process will timeout as shown in 516.

Figure 6A:
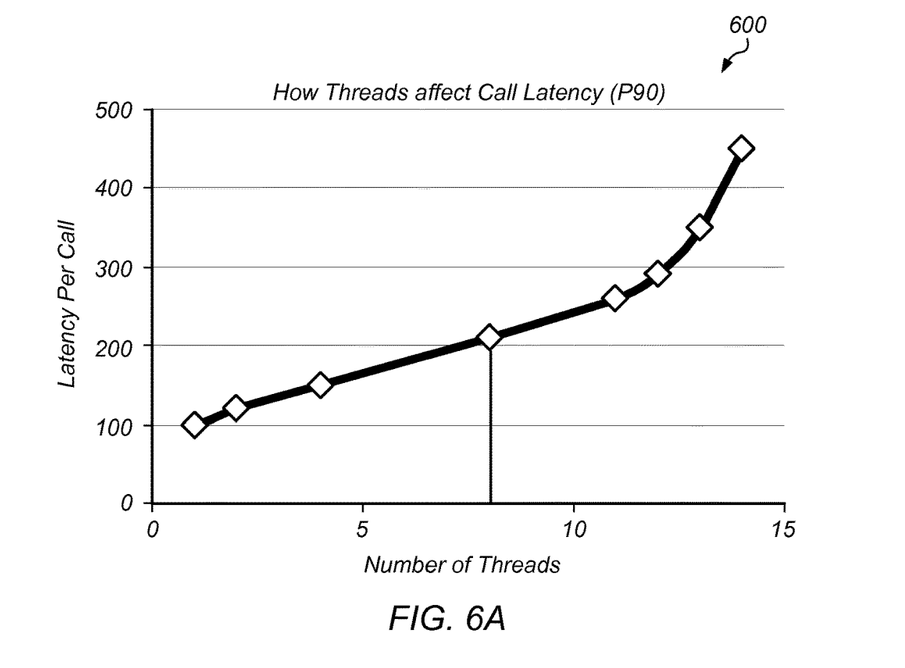
FIGS. 6A and 6B illustrate examples of performance variations for different values of a configurable parameter, according to one embodiment.
Figure 6B:
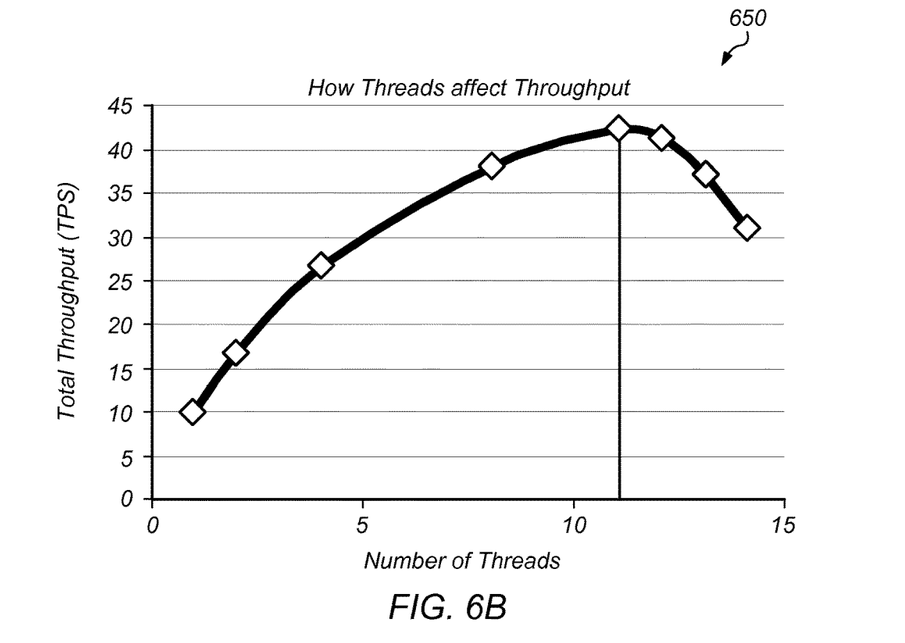

Because some parameters may not scale linearly from a single host to multiple hosts, the optimal configuration determined for a single host may be validated for multiple hosts before putting the optimal configuration into production. FIGS. 6A and 6B illustrate examples of performance variations for different values of a configurable parameter, according to one embodiment. In particular, FIG. 6A illustrates an example graph 600 indicating how the number of threads affects the latency per call. FIG. 6B illustrates an example graph 650 indicating how the number of threads affects the total throughput (in transactions per second). In the example of FIG. 6A, if the user-specified performance goal is that the P90 (i.e., $90^{th}$ percentile) latency is below 210 ms, then the automated tuning system may recommend 8 threads. On the other hand, if the user-specified performance goal is to maximize overall throughput, then the automated tuning system may recommend 11 threads for a maximum of 42 transactions per second (but with a P90 of 260 ms).

Illustrative Computer System

In at least some embodiments, a computer system that implements a portion or all of one or more of the technologies described herein, such as the automated tuning configuration system 100, may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above with respect to FIGS. 1 through 6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures (e.g., FIGS. 2 and 5) and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   at least one processor;
   a memory coupled to the at least one processor, wherein the memory stores program instructions, wherein the program instructions are executable by the at least one processor to:
   automatically select one or more optimal parameter values for a service on a test computer, wherein, for each of a plurality of test parameter values for the service on the test computer, the program instructions are executable by the at least one processor to execute one or more load tests on the test computer, wherein the one or more optimal parameter values are automatically selected from among the plurality of test parameter values based at least in part on a corresponding performance of the service on the test computer for different ones of the plurality of test parameter values;

automatically determine a performance of the service on a plurality of additional test computers configured with the one or more optimal parameter values, wherein the program instructions are executable by the at least one processor to execute a plurality of additional load tests on the plurality of additional test computers;

automatically configure the service on a plurality of production computers with the one or more optimal parameter values responsive to detection of improvement of a performance of the service on the plurality of additional test computers with the one or more optimal parameter values, in comparison with a baseline performance of the service on the plurality of additional test computers configured with other parameter values that differ from the one or more optimal parameter values; and discard the one or more optimal parameter values responsive to detection that the performance of the service on the plurality of additional test computers does not exceed the baseline performance of the service on the plurality of additional test computers.

2. The system as recited in claim 1, wherein the program instructions are further executable by the at least one processor to:

automatically determine a performance of the service on the plurality of production computers configured with the one or more optimal parameter values; and automatically restore one or more earlier parameter values of the service on the plurality of production computers if the performance of the service with the one or more optimal parameter values is not superior to an earlier performance with the one or more earlier parameter values.

3. The system as recited in claim 1, wherein the program instructions are further executable by the at least one processor to:

receive a user-defined performance goal;

wherein the one or more optimal parameter values are automatically selected to meet the user-defined performance goal.

4. The system as recited in claim 1, wherein the program instructions are further executable by the at least one processor to:

receive a user-defined testing frequency;

wherein automatically selecting the one or more optimal parameter values is scheduled according to the user-defined testing frequency.

5. The system as recited in claim 1, wherein the program instructions are further executable by the at least one processor to:

automatically provision the plurality of test computers from among the plurality of production computers.

6. The system as recited in claim 1, wherein the program instructions are further executable by the at least one processor to:

automatically provision the plurality of test computers from among a pool of available test computers, wherein the plurality of test computers are selected based on a similarity to the plurality of production computers.

7. A method, comprising:

automatically selecting one or more optimal parameter values for a service on a test computer, comprising, for each of a plurality of test parameter values for the service on the test computer, executing one or more load tests on the test computer, wherein the one or more optimal parameter values are automatically selected from among the plurality of test parameter values based at least in part on a corresponding performance of the service on the test computer for different ones of the plurality of test parameter values;

automatically determining a performance of the service on a plurality of additional test computers configured with the one or more optimal parameter values, comprising executing a plurality of additional load tests on the plurality of additional test computers;

automatically configuring the service on a plurality of production computers with the one or more optimal parameter values responsive to detection of improvement in a performance of the service on the plurality of additional test computers with the one or more optimal parameter values, compared with a baseline performance of the service on the plurality of additional test computers configured with other parameter values that differ from the one or more optimal parameter values; and discarding the one or more optimal parameter values responsive to detection that the performance of the service on the plurality of additional test computers does not exceed the baseline performance of the service on the plurality of additional test computers.

8. The method as recited in claim 7, further comprising:

automatically determining a performance of the service on the plurality of production computers configured with the one or more optimal parameter values; and automatically restoring one or more earlier parameter values of the service on the plurality of production computers if the performance of the service with the one or more optimal parameter values is not superior to an earlier performance with the one or more earlier parameter values.

9. The method as recited in claim 7, further comprising:

receiving a user-defined performance goal;

wherein the one or more optimal parameter values are automatically selected to meet the user-defined performance goal.

10. The method as recited in claim 7, further comprising:

receiving a user-defined testing frequency;

wherein automatically selecting the one or more optimal parameter values is scheduled according to the user-defined testing frequency.

11. The method as recited in claim 7, further comprising:

automatically provisioning the plurality of test computers from among the plurality of production computers.

12. The method as recited in claim 7, further comprising:

automatically provisioning the plurality of test computers from among a pool of available test computers, wherein the plurality of test computers are selected based on a similarity to the plurality of production computers.

13. The method as recited in claim 7, further comprising:

automatically determining one or more configurable parameters in the test computer;

automatically determining a range of values for the one or more configurable parameters; and for each of the plurality of test parameter values, automatically assigning respective values for the configurable parameters within the range of values.

14. The method as recited in claim 7, further comprising:
automatically generating a plurality of test loads using a hill-climbing loop, wherein each successive iteration of the hill-climbing loop increases a frequency of transactions;
wherein the plurality of load tests are performed using the test loads.

15. A computer-readable storage medium storing program instructions computer-executable to perform:
automatically selecting one or more optimal parameter values for a service on a test computer, wherein, for each of a plurality of test parameter values for the service on the test computer, the program instructions are executable by at least one processor to execute one or more load tests on the test computer, wherein the one or more optimal parameter values are automatically selected from among the plurality of test parameter values based at least in part on a comparison of corresponding performance of the service on the test computer for different ones of the test parameter values;
automatically determining a performance of the service on a plurality of additional test computers configured with the one or more optimal parameter values, wherein the program instructions are executable by the at least one processor to execute a plurality of additional load tests on the plurality of additional test computers;
automatically configuring the service on a plurality of production computers with the one or more optimal parameter values responsive to detection of improvement of a performance of the service on the plurality of additional test computers with the one or more optimal parameter values, in comparison with a baseline performance of the service on the plurality of additional test computers configured with other parameter values that differ from the one or more optimal parameter values; and
discarding the one or more optimal parameter values responsive to detection that the performance of the service on the plurality of additional test computers does not exceed the baseline performance of the service on the plurality of additional test computers.

16. The computer-readable storage medium as recited in claim 15, wherein the program instructions are further computer-executable to perform:
automatically determining a performance of the service on the plurality of production computers configured with the one or more optimal parameter values; and
automatically restoring one or more earlier parameter values of the service on the plurality of production computers if the performance of the service with the one or more optimal parameter values is not superior to an earlier performance with the one or more earlier parameter values.

17. The computer-readable storage medium as recited in claim 15, wherein the program instructions are further computer-executable to perform:
receiving a user-defined performance goal;
wherein the one or more optimal parameter values are automatically selected to meet the user-defined performance goal.

18. The computer-readable storage medium as recited in claim 15, wherein the program instructions are further computer-executable to perform:
receiving a user-defined testing frequency;
wherein automatically selecting the one or more optimal parameter values is scheduled according to the user-defined testing frequency.

19. The computer-readable storage medium as recited in claim 15, wherein the program instructions are further computer-executable to perform:
automatically provisioning the plurality of test computers from among the plurality of production computers.

20. The computer-readable storage medium as recited in claim 15, wherein the program instructions are further computer-executable to perform:
automatically provisioning the plurality of test computers from among a pool of available test computers, wherein the plurality of test computers are selected based on a similarity to the plurality of production computers.

* * * * *